T. E. MURRAY.
METER TESTING CONNECTION BLOCK.
APPLICATION FILED SEPT. 1, 1911.
1,036,507.
Patented Aug. 20, 1912.
2 SHEETS—SHEET 1.
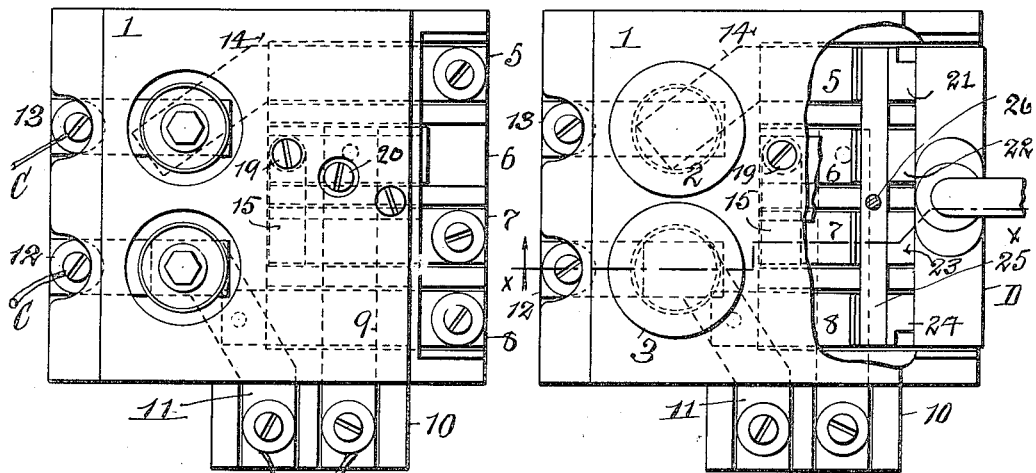
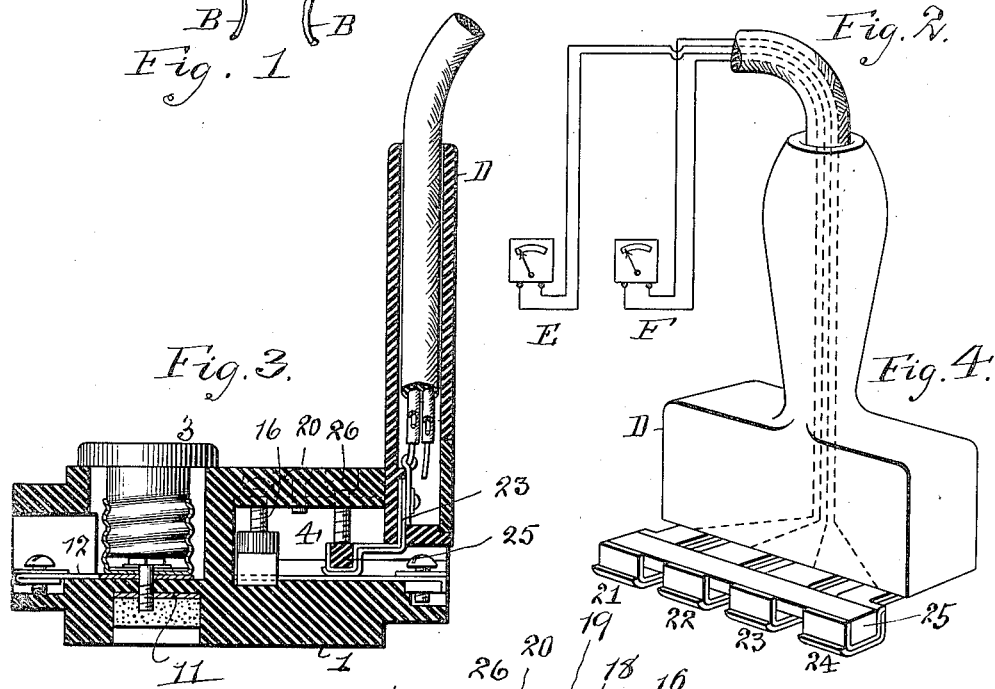
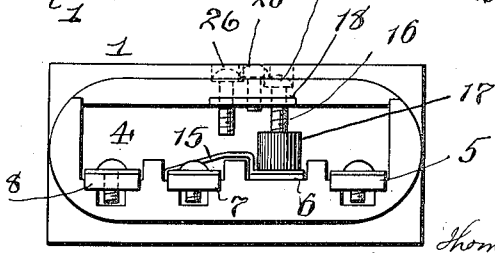
Witnesses:
Gertrude T. Porter
May T. McGarry
Inventor
Thomas E. Murray
By his Attorney

T. E. MURRAY.
METER TESTING CONNECTION BLOCK.
APPLICATION FILED SEPT. 1, 1911.

1,036,507.

Patented Aug. 20, 1912.

2 SHEETS—SHEET 2.

UNITED STATES PATENT OFFICE.

THOMAS E. MURRAY, OF NEW YORK, N. Y.

METER-TESTING CONNECTION-BLOCK.

1,036,507.   Specification of Letters Patent.   Patented Aug. 20, 1912.

Application filed September 1, 1911. Serial No. 647,151.

*To all whom it may concern:*

Be it known that I, THOMAS E. MURRAY, a citizen of the United States, residing at New York, in the county of New York and State of New York, have invented a certain new and useful Improvement in Meter-Testing Connection-Blocks, of which the following is a specification.

The invention relates to meter testing connection blocks, and consists in the construction, hereinafter described, whereby the meter may be connected with suitable measuring instruments, without breaking circuit from the service main to the load. The especial feature of the construction is the spring bridge which extends over a gap in the connection between the load circuit and the field coil of the meter, and is operable from the exterior of the block. Said bridge is disposed in a cavity in the side of the block, which cavity also contains the contact plates, to which the meter terminals are connected, and receives a gang plug which coöperates with said contact plates to bring the measuring instruments into circuit.

Figure 6:
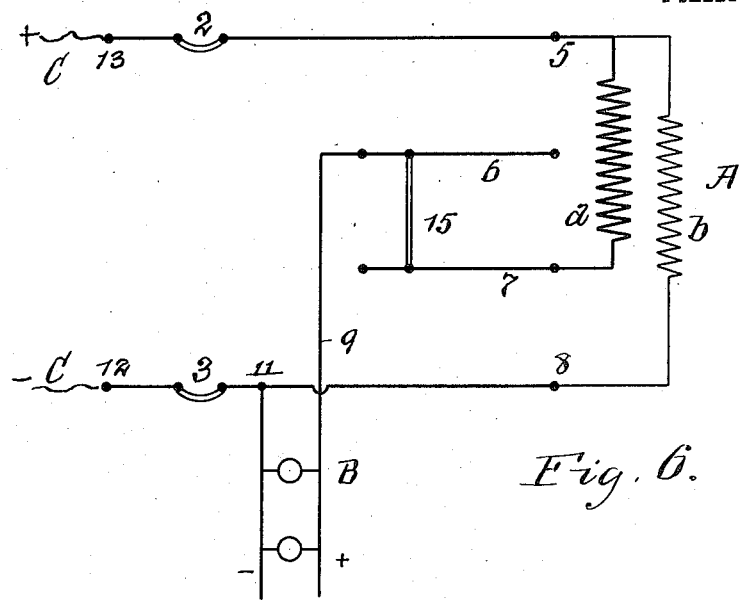
Figure 7:
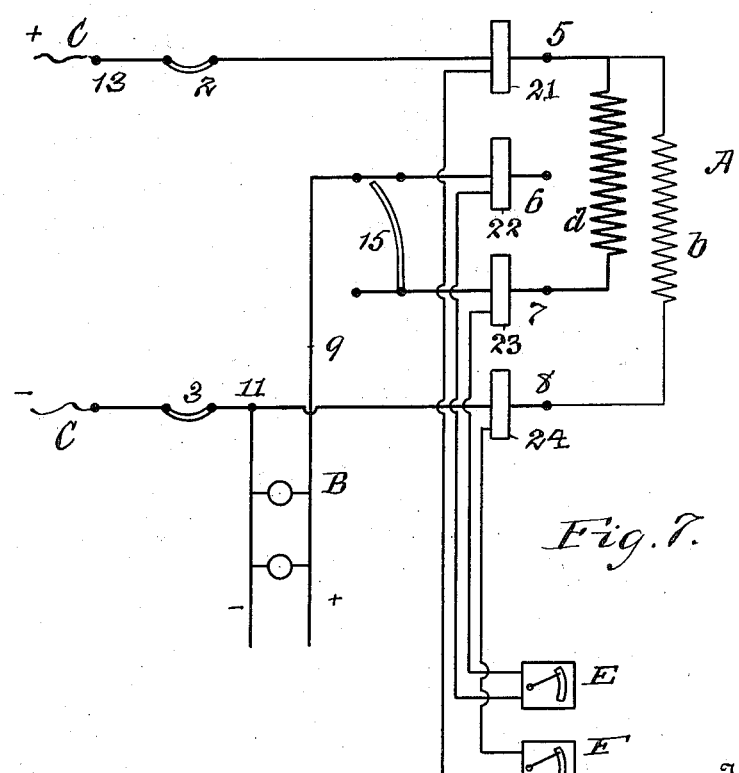

In the accompanying drawings—Figure 1 is a top view of my meter testing cut-out block, with the fuses removed. Fig. 2 is a similar view, with the fuses in place, a portion of the top wall of the block being broken away to show the contact plates. Fig. 3 is a section on the line $x, x$ of Fig. 2, taken in the direction of the arrow. Fig. 4 is a perspective view of the gang plug, showing the connection of the testing instruments. Fig. 5 is an end view of the block showing the spring bridge therein. Fig. 6 is an electrical diagram showing the normal connection with the meter connected in circuit, and the spring bridge closed. Fig. 7 is a similar view, showing the connection when the gang plug is in place, and the spring bridge open.

Similar numbers and letters of reference indicate like parts.

The base block 1 is preferably formed integrally of porcelain or other refractory material, and is provided with sockets to receive the usual threaded sleeves and contacts for the screw fuse plugs 2, 3. In one side of the block is a cavity 4, on the bottom of which are four channels which receive the contact plates 5, 6, 7, 8. The contact plates 5, 7 and 8 are provided with binding clips for the attachment of the terminals of the meter, shown diagrammatically at A in Figs. 6 and 7. The plate 6, which is shorter than the others, is connected to a metal plate 9, which enters a channel in an offset 10 formed integrally with the body of the block 1, and to said plate is attached one terminal of the load circuit B. The other terminal of said load circuit is connected to a plate 11, also disposed in a channel in the offset 10, which plate is connected through the fuse 3 to a contact plate 12, to which one terminal of the service circuit C is connected. The other terminal of the serice circuit is connected to a contact plate 13 which connects through the fuse 2 with a metal strip 14, which in turn is connected to the contact plate 5.

Secured to the contact plate 7 and within the body of the block is a spring circuit closer 15, forming a bridge which extends from contact plate 7 to and over contact plate 6. The bridge 15 is forced into contact with the plate 6 by means of a screw 16, provided at its end with an insulating block 17, bearing upon said bridge, and extends upward through a plate 18 on the under side of the top wall, and then through said wall to a recess which receives its nicked head 19. By turning said screw by means of a screw driver, the block 17 is raised to permit the spring 15 to rise, by its own resiliency, or forced downward to bring said bridge into contact with the plate 6. The plate 18 is secured in place in a recess on the under side of the top wall by means of the screw 20.

The gang plug, Fig. 4, comprises a holder D of refractory insulating material, and four spring plugs 21, 22, 23, 24, of metal, which extend laterally from the holder and are bent to receive a supporting bar 25, also of refractory material. The plugs 22 and 23 are flexibly connected, as shown in dotted lines Fig. 4, to an ammeter E, and the plugs 21 and 24 are similarly connected to a voltmeter F, the connecting wires preferably passing through the holder. The holder and plugs for convenience are hereinafter termed a " gang plug."

Under normal conditions, as shown in Fig. 6, the spring bridge 15 is forced downward into contact with the plate 6 to close the gap which normally exists between the plates 6 and 7. The circuit is then as follows: from the contact plate 13, to which one terminal of main line C is connected, through plug 2, to terminal 5, field coil $a$ of meter A, contact plate 7, by spring bridge 15, to contact plate 6, and to metal strip 9, load circuit B, contact plate 11, through fuse 3, to contact plate 12, and other terminal of main line. The potential coil $b$ of meter A is connected to contact plates 5 and 8. When it is desired to test the meter, the four plugs 21, 22, 23, 24 are inserted into the cavity 4 in the base block 1, as shown in Fig. 3, so that said plugs respectively make contact with the plates 5, 6, 7 and 8, and then are held in this position by means of a screw 26, which passes down through the top wall of the block and the plate 18, and bears upon the top of the bar 25, also as shown in Fig. 3. The screw 16 is then turned to raise the insulating block 17, and so permit the spring 15 to rise by its own resiliency out of contact with the plate 6, thus opening the gap between the plates 6 and 7. In this way, as shown in Fig. 7, the voltmeter is connected across the potential coil $b$ of the meter, and the ammeter is brought into series with the field coil $a$ and the load circuit B, so that the meter A can now be tested: and this without interrupting the supply of current from the service mains C to the load circuit B.

I claim:

1. A meter testing connection block, comprising a base, main, load, and meter circuit terminals and connections thereon, the said meter circuit terminals being disposed in a cavity formed in one side of said base, a spring circuit closer in said cavity and interposed between a meter field coil terminal and a terminal of the load circuit, a gang plug constructed to enter said cavity and to coöperate with said meter circuit terminals, and means for operating said circuit closer extending through the wall of said block above said cavity.

2. A meter testing connection block, comprising a base, main, load and meter circuit terminals and connections thereon, the said meter circuit terminals being disposed in a cavity formed in one side of said base, a spring circuit closer in said cavity and interposed between a meter field coil terminal and a terminal of the load circuit, means for operating said circuit closer extending through the wall of said block above said cavity, and a gang plug comprising a holder and spring contact arms extending laterally therefrom and entering said cavity to coöperate with said meter circuit terminals.

In testimony whereof I have affixed my signature in presence of two witnesses.

THOMAS E. MURRAY.

Witnesses:
 GERTRUDE T. PORTER,
 MAY T. MCGARRY.